United States Patent [19]

Gallucci

[11] Patent Number: 4,632,962

[45] Date of Patent: Dec. 30, 1986

[54] HYDROXYL GROUP GRAFT MODIFIED POLYOLEFINS

[75] Inventor: Robert R. Gallucci, Pittsfield, Mass.

[73] Assignee: General Electric Company, Pittsfield, Mass.

[21] Appl. No.: 685,544

[22] Filed: Dec. 24, 1984

[51] Int. Cl.$^4$ ................................................. C08F 8/32
[52] U.S. Cl. .................................. 525/282; 525/327.6; 525/379
[58] Field of Search ............................... 525/327.6, 282

[56] References Cited

U.S. PATENT DOCUMENTS

| | | | |
|---|---|---|---|
| 3,250,323 | 5/1966 | Zeitlin | 260/857 |
| 3,301,826 | 1/1967 | Tawney | 525/282 |
| 3,527,736 | 9/1970 | Averink et al. | 525/282 |
| 3,953,655 | 4/1976 | Steinkamp et al. | 428/474 |
| 4,055,535 | 10/1977 | Arrighetti et al. | 525/282 |
| 4,071,494 | 1/1978 | Gaylord | 260/42.14 |
| 4,147,740 | 4/1979 | Swiger et al. | 260/878 |
| 4,157,431 | 6/1979 | Fields et al. | 525/375 |
| 4,172,859 | 10/1979 | Epstein | 428/402 |
| 4,357,250 | 11/1982 | Hayashi | 252/51.5 A |
| 4,410,661 | 10/1983 | Epstein et al. | 525/66 |
| 4,448,906 | 5/1984 | Deinet et al. | 525/282 |

OTHER PUBLICATIONS

De Vito, et al., "Functionalization of an Amorphous Ethylene-Propylene Copolymer by Free Radical Initiated Grafting of Unsaturated Molecules", J. Poly Sci., 22, pp. 1335–1347 (1984).

*Primary Examiner*—Joseph L. Schofer
*Assistant Examiner*—Bernard Lipman
*Attorney, Agent, or Firm*—Richard J. Traverso; William F. Mufatti; Edward K. Welch, II

[57] ABSTRACT

Polyolefins are graft modified with functional hydroxyl groups through an imide linkage and chemically reacted with polymerized polycarbonates, polyesters, and/or poly(ester-carbonates) to produce a thermoplastic molding composition.

9 Claims, No Drawings

HYDROXYL GROUP GRAFT MODIFIED POLYOLEFINS

This invention relates to graft modified polyolefins. More particularly, this invention relates to hydroxyl group graft modified polyolefins and to blends thereof with polycarbonates, polyesters, and poly(ester-carbonates).

BACKGROUND

Graft modified polyolefins are well known and widely used to render the generally incompatible polyolefins compatible with a variety of thermoplastics in blend compositions. The graft modifier may, for example, provide a point on the polyolefin chain where physical compatibility or miscibility between the polyolefin and thermoplastic is enhanced. Alternatively, the graft modifier may provide a site on the polyolefin chain where the polyolefin and thermoplastic undergo and are joined by chemical bonding.

Canadian Pat. No. 636,450 discloses blends of high density polyethylene with a thermoplastic resin. Although special compounding procedures are taught, the blend remains generally unsatisfactory due to the incompatibility of the polyethylene with the thermoplastic.

U.S. Pat. No. 3,250,823 discloses blends of polyethylene/maleate diester graft copolymer with polycarbonate, polycarbonamides, and polyoxymethylenes. These blends demonstrate improved compatibility between the polymer constituents.

U.S. Pat. No. 4,147,740 discloses a maleic anhydride graft modified polyethylene mixed with polyamide. The polyethylene and polyamide are chemically linked by the reaction of a terminal amine with the maleic anhydride graft moiety.

Other references reveal graft modified polyolefin in blends with thermoplastics, i.e., U.S. Pat. No. 4,071,494, Gaylord; U.S. Pat. No. 4,172,859, Epstein; and U.S. Pat. No. 4,410,661, Epstein, et al.

Thus, graft modified polyolefins are widely known and used, especially, to produce compatible blends with polyamides. However, there is a need for graft modifiers to compatibilize polyolefins with a wide range of thermoplastic materials.

Therefore, it is an object of the present invention to produce hydroxyl group graft modified polyolefins.

It is yet another object of the present invention to produce network thermoplastic blends of polyolefin and polycarbonate, polyester, poly(ester-carbonate), and/or mixtures thereof having improved impact strength, improved solvent resistance, and reduced problems with incompatibility.

DETAILED DESCRIPTION OF THE INVENTION

Briefly, according to the present invention, hydroxyl group graft modified polyolefins are produced and reacted with polycarbonates, polyesters, and/or poly(ester-carbonates) to produce thermoplastic molding compositions with unique properties. Graft modified polyolefins are made herein by grafting an anhydride functional group to a polyolefin chain and imidizing the same with an amine substituted organic alcohol thus, producing a hydroxyl group graft modified polyolefin.

The hydroxyl group graft modified polyolefins of the present invention may be represented by the general formula:

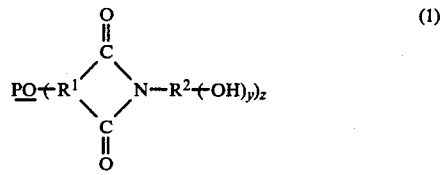

wherein PO is a polyolefin, $R^1$ is a substituted or unsubstituted, trivalent, aromatic or aliphatic organic residue of from 2–15 carbon atoms, $R^2$ is a substituted or unsubstituted di-, tri-, or tetravalent aromatic or aliphatic organic residue of from 1–15 carbon atoms, y is 1, 2, or 3, but preferably 1, and z is preferably from about $1 \times 10^{-6}$ to about $1 \times 10^{-1}$ moles per 100 g of PO. It is obvious that the two carboxylic moieties adjacent to $R^1$ may not be attached to the same carbon atom.

The hydroxyl group graft modified polyolefins may be produced by any means known to the art. An ethylenicially unsaturated polycarboxylic anhydride may be grafted onto the polyolefin backbone by conventional techniques. Subsequently, an amine substituted organic alcohol may be reacted with the anhydride group through an imidization reaction to produce a hydroxy functionalized polyolefin.

Though not preferred due to reduced reactivity of the anhydride group, the unsaturated polycarboxylic anhydride may be copolymerized into the polyolefin backbone and thereby produce an anhydride functional polyolefin for the subsequent imidization taught herein.

Suitable polyolefins for use include homopolymers and copolymers of $C_2$ to $C_8$ mono-alphaolefins and diolefins. Examples of such suitable polyolefins include both plastic and elastomeric polyethylene, polypropylene, polybutene-1, poly-3-methylbutene-1, poly-4-methylpentene-1, copolymers of monoolefins with other olefins (mono- or diolefins) such as propylene, butadiene, methylene norbornene, and isoprene or vinyl monomers with one or more additional monomers, i.e., EPDM, ethylene/butylene copolymer, ethylene/vinyl acetate copolymer, ethylene/ethyl acrylate copolymer, propylene/4-methyl pentene-1 copolymer, and the like. Preferred polyolefins contain at least about 50 percent by weight ethylene. Preferred polyolefins have a density of at least about 0.85, preferably, at least about 0.915 or higher, and are prepared by any method well known to those skilled in the art, including those described in the *Encyclopedia of Polymer Science and Technology*, Vol. 6, entitled "Ethylene Polymers", pages 275–454, Interscience Publishers (1969), which disclosures are incorporated herein by reference. Ethylene polymers prepared by low pressure or high pressure techniques which are commonly employed in the preparation of linear or high density polyethylenes, branched or low density polyethylenes, and linear and low density polyethylenes, well known to those skilled in the art can be employed in the practice of this invention.

Suitable unsaturated polycarboxylic anhydrides are unsaturated cyclic polycarboxylic anhydrides, ethylenically unsaturated polycarboxylic acids which form anhydrides at elevated temperatures as well as esters of such polycarboxylic acids. Illustrative of polycarboxylic anhydrides, acids and esters among others that are suitable polyethylene modifiers, are the following: maleic acid, itaconic acid, citraconic acid, mesaconic acid, maleic anhydride, citraconic anhydride, itaconic anhydride, 4-methyl cyclohex-4-ene 1,2-dicarboxylic acid anhydride, bicyclo[2.2.2]oct-5-ene-2,3-dicarboxylic acid anhydride, 1,2,3,4,5,8,9,10-octahydronaphthalene-2,2-dicarboxylic acid anhydride 2-oxa-1,3-diketospiro[4,4]non-7-ene, or bicyclo[2.2.1]hept-5-ene-2,3-dicarboxylic acid anhydride, dimethylmaleate, dipropyl maleate, diisobutyl maleate, dicyclocopentyl maleate, dihexyl maleate, dibenzyl maleate, p-chlorophenyl methyl maleate, phenylethyl maleate, etc. Particularly preferred polycarboxylic anhydrides comprise maleic anhydride compounds of the formula:

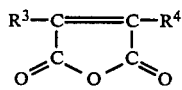

wherein $R^3$ and $R^4$ are hydrogen, a halogen or an alkyl group. Specific examples include maleic anhydride, monochloromaleic anhydride, dichloromaleic anhydride, citraconic anhydride, dimethylmaleic anhydride, etc. Of these maleic anhydride is preferred for economic reasons, e.g., ready availability and low cost.

Of course, the number of unsaturated polycarboxylic anhydrides grafted to the polyolefin chain eventually determines the value of z in Formula 1. Thus, from about $1 \times 10^{-6}$ to about $1 \times 10^{-1}$, preferably from about $5 \times 10^{-4}$ to about $2.5 \times 10^{-2}$ and more preferably from about $1 \times 10^{-3}$ to about $1.5 \times 10^{-2}$ moles of unsaturated polycarboxylic anhydride should be grafted per 100 grams polyolefin.

These anhydride functional group containing monomers are readily attached to the polyolefin backbone by "graft polymerization techniques" well known to those skilled in the art. Illustrative of graft polymerization techniques are those disclosed in U.S. Pat. No. 4,147,740, Swiger, et al.; U.S. Pat. No. 3,953,655, Steinkamp, et al.; and U.S. Pat. No. 3,250,823, Zeitlin.

Suitable amine substituted organic alcohols, for use in the instant invention are aromatic alcohols such as o-aminophenol, m-aminophenol, p-aminophenol, 5-amino-3-cresol, 5-amino-2-cresol, aminohydroquinone, 3-aminoresorcinol, aminocatechol, 2-amino-2-(4-hydroxyphenyl)propane, 2-(4-aminophenyl)-2-(4'-hydroxyphenyl)propane, etc., and aliphatic alcohols such as 1-aminoethanol, 3-amino-propanol, 2-aminomethylene-2-hydroxypropane 1-methanol-4-aminomethylene cyclohexane, etc. The preferred amine substituted aromatic alcohol is m-aminophenol and aliphatic alcohol is aminoethanol.

The amine substituted organic alcohol is attached to the anhydride substituted polyolefin through an imidization reaction. A simple heating step under by-product removing conditions is performed on a mixture of the unsaturated polycarboxylic anhydride substituted polyolefin and amine substituted organic alcohol. Generally, this requires heating the mixture under a vacuum to a temperature of from about 80° C. to about 300° C. An optional catalyst may be used but is not essential.

Thus, a hydroxyl group graft modified polyolefin is produced according to Formula 1 as shown above wherein $R^1$ is determined by the particular unsaturated polycarboxylic anhydride and $R^2$ is determined by the particular amine substituted organic alcohol employed.

As stated above, the phenol graft modified polyolefin is blended with polycarbonate, polyester, poly-(ester-carbonate) or mixtures thereof, and chemically bonded to form a compatible solvent resistant thermoplastic with improved impact strength. The chemical bonding between the modified polyolefin and condensation polymer takes place by reacting the hydroxyl functionality of the modified polyolefin with the ester or carbonate group of the condensation polymer through a transesterification reaction. Generally, the chemical bonding may be carried out in a melt blend of the materials at temperatures greater than about 150° C. and optionally in the presence of a catalyst.

Suitable polycarbonates include aromatic polycarbonates commonly known to those skilled in the art. These may be prepared by reacting a dihydric phenol with a carbonate precursor, such as phosgene, a haloformate or a carbonate ester. Typically, they will have recurring structural units of the formula:

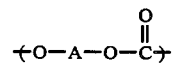

wherein A is a divalent aromatic radical of the dihydric phenol employed in the polymer producing reaction. Preferably, the aromatic polycarbonate polymers have an intrinsic viscosity ranging from 0.30 to 1.0 dl./g. (measured in methylene chloride at 25° C.). By dihydric phenol is meant mononuclear or polynuclear aromatic compounds containing two hydroxy radicals, each of which is attached to a carbon atom of an aromatic nucleus. Typical dihydric phenols or diols include: 2,2-bis-(4-hydroxyphenyl)propane; (4,4'-dihydroxy-diphenyl)methane; 2,2-bis-(3,5-dimethyl-4-hydroxyphenyl)propane; 4,4'-dihydroxy-diphenyl ether; bis(3,5-dimethyl-4-dihydroxyphenol)sulfone; mixtures thereof and the like. Additional dihydric phenols are described in U.S. Pat. Nos. 3,028,365 and 3,737,409 incorporated herein by reference. The preferred aromatic polycarbonate is a homopolymer derived from 2,2-bis(4-hydroxyphenyl)propane, that is, BPA.

Suitable polyesters for use herein include polyesters of aromatic diacids optionally mixed with other diacids and aliphatic, cycloaliphatic, and aromatic diols. Typically, these polyesters have repeating units of the following general formula:

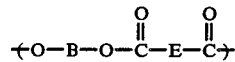

wherein B is a divalent aliphatic, cycloaliphatic, or aromatic radical derived from for example ethylene glycol, trimethylene glycol, tetramethylene glycol, hexamethylene glycol, 1,4-cyclohexane dimethanol, neopentyl glycols hydroquinone, the dihydric phenols as described above, etc.; and E is derived in major part from aromatic difunctional carboxylic acids, such as, terephthalic acid, isophthalic acid, phthalic acid, homophthalic acid, o-,m-,p-phenylene diacetic acid, 2,6-naphthalenedicarboxylic acid, 2,7-naphthalenedicarboxylic acid, 1,5-naphthalenedicarboxylic acid, diphenic acid, 1,4-naphthalic acid, mixtures thereof, polyester forming derivatives thereof, etc., and optionally, in lesser part from aliphatic and cycloaliphatic difunctional carboxylic acids such as, sebacic acid and adipic acid. Preferably, B is by number at least 50 percent aromatic diols such as, the bisphenols; and E is derived in major part from terephthalic acid.

The polyester of the present invention may be made by conventional methods, usually, with a titanium catalyst and preferably, has an intrinsic viscosity (measured in o-chlorophenol at 35° C.) of 0.3 to 1.5 dl./g.

Suitable poly(ester-carbonates) for use in the present invention are known and can be obtained commercially. Generally, they are copolyesters comprising recurring carbonate groups:

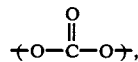

carboxylate groups:

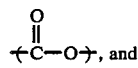

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as, those described above with a diol as described above and a carbonate precursor. A particularly useful poly(ester-carbonate) is derived from bisphenol-A, isophthalic acid, terephthalic acid, or a mixture of isophthalic acid and terephthalic acid or the reactive derivatives of these acids such as terephthaloyl dichloride, isophthaloyl dichloride, or a mixture thereof and phosgene. The molar proportions of dihydroxy diaryl units to benzenedicarboxylate units to carbonate units can range from 1:0.30–0.80:0.70–0.20 and the molar range of terephthalate units to isophthalate units can range from 9:1 to 2:8 in this preferred family of resins.

In order that those skilled in the art will be better able to practice the invention, the following examples are given by way of illustration and not by way of limitation. All parts, except as otherwise indicated, are by weight.

EXAMPLE 1

100 parts low density polyethylene (PE), 1.5 parts maleic anyhydride, 0.1 parts dicumyl peroxide were tumbled and mixed in a paint shaker. The resultant mixture was extruded in a 28 mm twin screw extruder at a screw speed of 100 rpm and a barrel temperature profile ranging from about 350° F. to about 500° F., quenched in water and pelletized. The resulting resin was a polyethylene graft maleic anhydride (PE$_g$MA).

EXAMPLE 2

100 parts of the polyethylene graft maleic anhydride from Example 1 was tumbled and mixed in a paint shaker with 1.7 parts m-aminophenol. The resulting mixture was extruded in a ⅜" single screw extruder at a screw speed of 50 rpm and a barrel temperature profile ranging from about 350° F. to about 500° F., quenched in water and pelletized. The resulting resin was a PE$_g$MA graft modified m-aminophenol (PE$_g$ Phenol).

EXAMPLE 3

Example 2 was repeated with 1.5 parts aminoethanol. The resulting resin was a PE$_g$MA graft modified aminoethanol (PE$_g$ Ethanol).

EXAMPLE 4

Example 2 was repeated with 1.5 parts p-aminophenol. The resulting resin was a PE$_g$MA graft modified p-aminophenol.

EXAMPLE 5

Test pieces having ingredients as shown below were produced by melt blending the resin described in Examples 1, 2 or 3 with polycarbonate at 200°–300° C. The resultant product was dried and injection molded into standard ASTM parts on a 3 oz. Newberry injection molding machine at a 550° F. set temperature. The exact formulations and their properties are listed below.

|  | A | B | C | D | E | F | G | H | I |
|---|---|---|---|---|---|---|---|---|---|
| Polycarbonate[1] | 95 | 90 | 85 | 85 | 95 | 90 | 85 | 90 | 85 |
| PE[2] | 5 | 10 | 15 | — | — | — | — | — | — |
| PE$_g$MA | — | — | — | 15 | — | — | — | — | — |
| PE$_g$ Phenol | — | — | — | — | 5 | 10 | 15 | — | — |
| PE$_g$ Ethanol | — | — | — | — | — | — | — | 10 | 15 |
| Notched Izod Impact, ft. lbs./in. ASTM 256 | 14.9 | 14.5 | 11.7 | 12.2 | 17.2 | 16.0 | 15.4 | 15.0 | 13.4 |

[1]LEXAN 105 resin, i.v. in chloroform = 0.53–0.56 dl./g., General Electric Company
[2]PETROTHENE 254 resin, U.S.I. Chemical

What is claimed is:

1. Hydroxyl group graft modified polyolefins having grafts consisting essentially of chemically combined units of the formula:

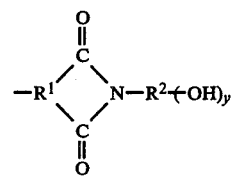

wherein, $R^1$ is a substituted or unsubstituted, trivalent, aromatic or aliphatic organic residue of from 2–15 carbon atoms, $R^2$ is a substituted or unsubstituted di-, tri-, or tetra- valent, aromatic or aliphatic organic residue of from 1–15 carbon atoms and y is 1, 2, or 3.

2. The hydroxyl group graft modified polyolefin of claim 1 wherein $R^1$ is derived from a compound selected from the group consisting of maleic anhydride, monochloromaleic anhydride, dichloromaleic anhydride, citraconic anhydride, and dimethylmaleic anhydride.

3. The hydroxyl group graft modified polyolefin of claim 1 wherein $R^2$ is derived from a compound selected from the group consisting of o-aminophenol, m-aminophenol, p-aminophenol, 5-amino-3-cresol, 5-amino-2-cresol, aminohydroquinone, 3-amino resorcinol, aminocatechol, 2-amino-2-(4'-hydroxyphenyl)propane, 2-(4-aminophenyl)-2-(4'-hydroxyphenyl)propane.

4. The hydroxyl group graft modified polyolefin of claim 1 wherein $R^2$ is derived from an amine substituted aliphatic alcohol.

5. The hydroxyl group graft modified polyolefin of claim 1 wherein y is 1.

6. Hydroxyl group graft modified polyolefins having the general formula:

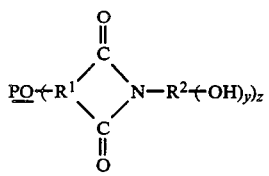

wherein $R^1$ is a substituted or unsubstituted, trivalent, aromatic or aliphatic organic residue of from 2–15 carbon atoms, $R^2$ is a substituted or unsubstituted di-, tri-, or tetra- valent, aromatic or aliphatic organic residue of from 1–15 carbon atoms, y is 1, 2, or 3 and z has a value of from about $1 \times 10^{-6}$ moles to about $1 \times 10^{-1}$ moles per 100 g of PO and PO is a polyolefin.

7. The hydroxyl group graft modified polyolefin of claim 6 wherein PO is at least about 50 percent by weight derived from ethylene monomers.

8. Hyodroxyl group graft modified polyolefins as in claim 6 wherein z has a value of from about $5 \times 10^{-4}$ moles to about $2.5 \times 10^{-2}$ moles per 100 grams PO.

9. Hydroxyl group graft modified polyolefins as in claim 1 which comprise 1.5 to 3.5 parts by weight graft units of formula II of claim 18 per 100 parts by weight polyolefin.

* * * * *